United States Patent
Cheung et al.

(10) Patent No.: US 9,420,418 B2
(45) Date of Patent: Aug. 16, 2016

(54) PASSIVE CHECK-IN

(71) Applicant: PayPal, Inc., San Jose, CA (US)

(72) Inventors: Dennis Cheung, Sunnyvale, CA (US); Greg Alan Cox, Portland, OR (US); Zhenyin Yang, Saratoga, CA (US); Dawnray Young, Camas, WA (US); Viswa Vaddi, Hillsboro, OR (US); Todd Davis, Canby, OR (US); Chintan Jain, Hillsboro, OR (US); Andrew Shea, Beaverton, OR (US); Raj Chinnakonda, Portland, OR (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/097,063

(22) Filed: Dec. 4, 2013

(65) Prior Publication Data

US 2014/0308977 A1    Oct. 16, 2014

Related U.S. Application Data

(60) Provisional application No. 61/812,175, filed on Apr. 15, 2013.

(51) Int. Cl.
| | |
|---|---|
| H04W 24/00 | (2009.01) |
| H04W 4/02 | (2009.01) |
| H04L 29/08 | (2006.01) |
| G07C 9/00 | (2006.01) |

(52) U.S. Cl.
CPC .............. *H04W 4/021* (2013.01); *H04L 67/26* (2013.01); *G07C 9/00111* (2013.01)

(58) Field of Classification Search
USPC ................. 455/456.3, 456.1, 456.2; 701/426; 709/204
See application file for complete search history.

(56) References Cited

U.S. PATENT DOCUMENTS

| 8,463,295 B1* | 6/2013 | Caralis | G06Q 30/0631 |
| | | | 455/414.2 |
| 2007/0185785 A1* | 8/2007 | Carlson | G06F 17/3087 |
| | | | 705/26.8 |
| 2010/0118025 A1 | 5/2010 | Smith et al. | |
| 2012/0302258 A1 | 11/2012 | Pai et al. | |
| 2012/0303498 A1 | 11/2012 | Cova et al. | |
| 2013/0006522 A1 | 1/2013 | Vellaikal et al. | |

(Continued)

FOREIGN PATENT DOCUMENTS

| CN | 105308416 A | 2/2016 |
| WO | WO-2014172388 A1 | 10/2014 |

OTHER PUBLICATIONS

"International Application Serial No. PCT/US2014/034242, International Search Report mailed Sep. 23, 2014", 2 pgs.
"International Application Serial No. PCT/US2014/034242, Written Opinion mailed Sep. 23, 2014", 4 pgs.

(Continued)

*Primary Examiner* — David Q Nguyen
(74) *Attorney, Agent, or Firm* — Schwegman Lundberg & Woessner, P.A.

(57) ABSTRACT

A system to effectuate passive check-in with respect to a user's mobile device is described. A server system may be configured to receive communications from a GPS-enabled mobile device (e.g., a mobile phone), extract a stream of locations from the received communications, and use the location information to determine whether a boundary-crossing event has occurred with respect to the mobile device. In response to detecting a boundary-crossing event, the server may communicate a message, such as a recommendation, to the mobile device.

18 Claims, 4 Drawing Sheets

(56) References Cited

U.S. PATENT DOCUMENTS

| | | | |
|---|---|---|---|
| 2013/0072226 A1 | 3/2013 | Thramann et al. | |
| 2013/0091058 A1 | 4/2013 | Huster | |
| 2013/0297688 A1* | 11/2013 | Zheng | G06Q 30/0205 709/204 |
| 2015/0118990 A1* | 4/2015 | Best | G08G 1/096775 455/404.2 |
| 2015/0172860 A1* | 6/2015 | Rosenstock | H04W 4/028 455/456.3 |

OTHER PUBLICATIONS

"Application Serial No. PCT/US2014/034242, International Preliminary Report on Patentability mailed Oct. 29, 2015", 6 pgs.

"European Application Serial No. 14785386.5, Response filed Feb. 19, 2016 to Communication pursuant to Rule 161(2) and 162 EPC mailed Nov. 24, 2015", 9 pgs.

"Australian Application Serial No. 2014254103, Office Action mailed May 17, 2016", 3 pgs.

* cited by examiner

PASSIVE CHECK-IN

CLAIM OF PRIORITY

This application claims the benefit of priority to U.S. Provisional Patent Application Ser. No. 61/812,175, filed on Apr. 15, 2013, which is incorporated by reference herein in its entirety.

TECHNICAL FIELD

This application relates to the technical fields of software and/or hardware technology and, in one example embodiment, to system and method to effectuate passive check-in with respect to a user's mobile device.

BACKGROUND

A geo-fence is a virtual boundary corresponding to a shape on the surface of the Earth. Geographic location may be detected by the use of the Global Positioning System (GPS). Using geo-fences (also referred to as merely "fences") together with GPS-enabled devices may be referred to as geo-fencing. An event associated with a user crossing from outside a geo-fence shape to inside that shape, based on the geographic location of the user determined by the GPS, is referred to as the fence being broken. GPS-enabled mobile devices may be used in combination with geo-fences for the purpose of triggering an action when mobile location-enabled devices enter and/or exit said boundaries. For example, a user may get a notification via their mobile device of an item being on sale. A merchant who operates inside that geo-fence may get a notification that the user is coming to pick up their item. A typical way that geo-fencing is done is that the fence gets sent down to a GPS-enabled device, such as, for example, a mobile device. The mobile device monitors the user's location. When the user crosses that fence, the mobile device takes a pre-defined action.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
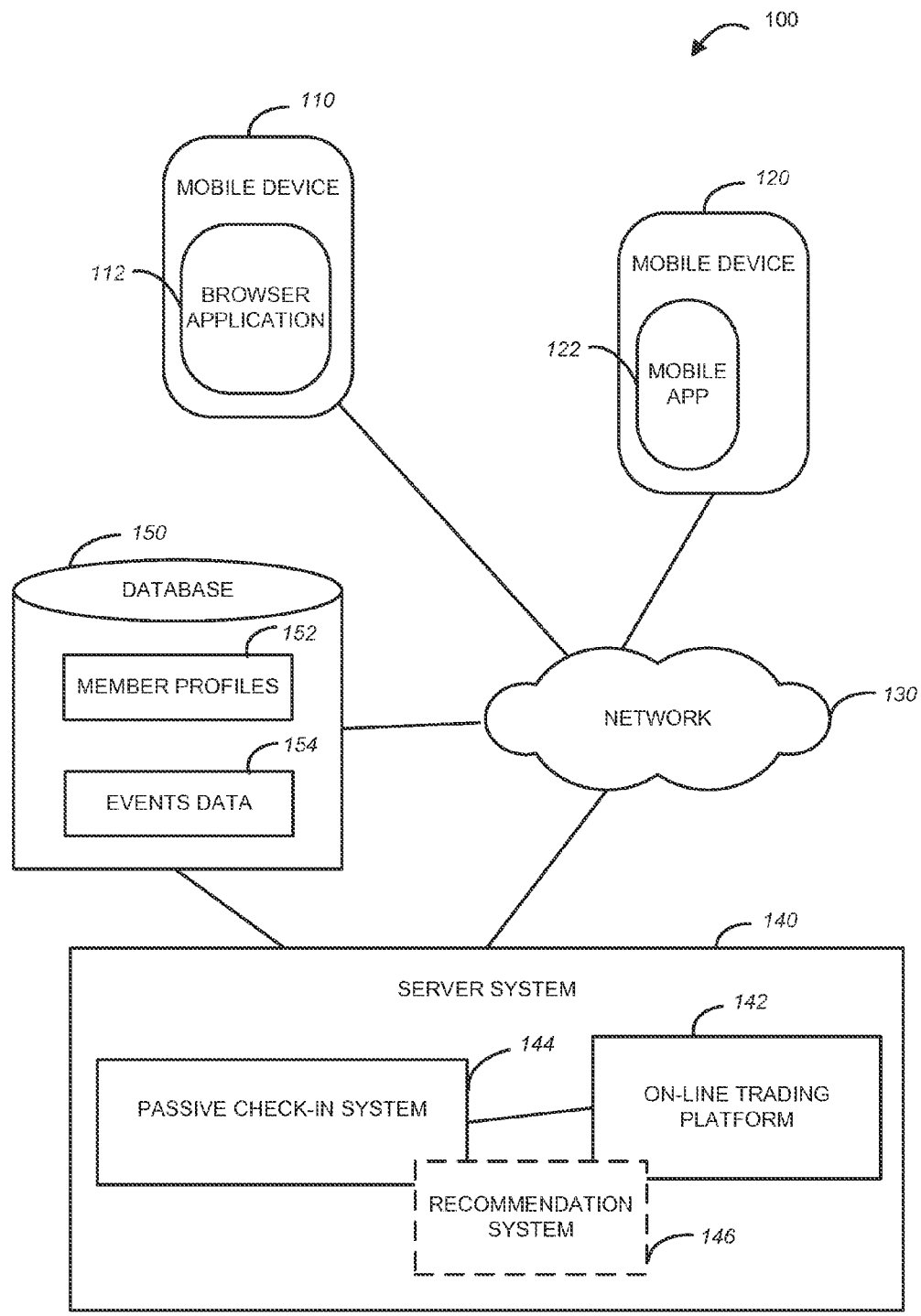
FIG. 1 is a diagrammatic representation of a network environment within which an example method and system to effectuate passive check-in with respect to a user's mobile device may be implemented.

Example methods and systems to effectuate passive check-in with respect to a user's mobile device are described. In the following description, for purposes of explanation, numerous specific details are set forth in order to provide a thorough understanding of example embodiments. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goat. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

As mentioned above, a mobile device may store one or more geo-fences and may also host a geo-fencing application configured to trigger an action in response to detecting that a stream of locations recorded by the mobile device indicates a crossing of a particular geo-fence. The processing of a stream of locations with respect to one or more geo-fences, 4m well as storing one or more goo-fences on a device, may consume considerable resources that may be limited in a mobile electronic device. In one embodiment, the processing of location information may be pushed from a mobile device to a server computer system (a server). A server system may be configured to receive communications from a GPS-enabled mobile device e.g., a mobile phone), extract the stream of locations from the received communications, use the location information to determine whether a boundary-crossing event has occurred with respect to the mobile device, and, if so, communicate a message to the mobile device. A boundary-crossing event is an event indicating that the user's current and previous location indicate that the user has crossed a boundary of a geo-fence. An approach where a server collects the stream of locations from a mobile device, without the user explicitly indicating a wish to report their location, may be referred to as passive check-in. A system hosted by a server that is configured to process a stream of locations received from a mobile device and detect fence-breaking events may be termed a passive check-in system. A server hosting a passive check-in system may also host a web-based platform that maintains profiles of registered members of an associated service. For example, such a web-based platform may be an on-line trading platform, a social networking system, etc.

A passive check-in system may receive a location stream from a mobile device via any application that reports location together with other information or requests communicated to the server. For example, a user of a mobile device may activate a mobile application on their mobile phone to inquire about a particular type of restaurants that can be found in close proximity to the user's current location. The passive check-in system may receive this request from the mobile device, determine, from the request, the user's current location, compare it to the previously stored user's earlier location, and, based on the result of comparison, determine that a particular geo-fence has been broken. The passive check-in system may also obtain the location stream from requests originated from a web browser accessed from a mobile device. While the passive check-in system may be configured to extract location information of a user from requests received at the server from the user's mobile device, location detection doesn't have to piggyback on a request. In some embodiments, the passive check-in system may be configured to periodically pull location information from a mobile device.

An example method and system to effectuate passive check-in with respect to a user's mobile device may be implemented in the context of a network environment 100 illustrated in FIG. 1. As shown in FIG. 1, the network environment 100 may include client systems, such as mobile devices 110 and 120 and a server system 140. The server system 140, in one example embodiment, may host an on-line trading platform 142. The on-line trading platform 142 may be configured to maintain member profiles, where respective profiles store identification, personal information, preferences, etc. of the users of the on-line trading platform 142. Member profiles and related information may be stored in a database 150 as member profiles 152.

The mobile devices 110 and 120 may be GPS-enabled devices and may run respective browser applications (such as, e.g., a browser application 112) and/or respective mobile applications (such as, e.g., a mobile app 122) and may have access to the server system 140 via a communications network 130. The communications network 130 may be a public network (e.g., the Internet, a mobile communication network, or any other network capable of communicating digital data). As shown in FIG. 1, the server system 140 also hosts a passive check-in system 144. In one example embodiment, the passive check-in system 144 is configured to receive, from a mobile device, a stream of locations obtained by the GPS provided with the mobile device, access one or more previously-stored geo-fences, and, based on the received stream of locations and the one or more geo-fences, determine an occurrence of an event indicative of the mobile device having crossed a geo-fence boundary. The monitored location stream and the associated boundary-crossing events may be stored in the database 150 as events data 154.

Also shown in FIG. 1 is a recommendation system 146. The recommendation system 146 may be provided as part of the check-in system 144, as part of the on-line trading platform 142 or any other web-based platform that cooperates with the passive check-in system 14.4, or it can be a stand-alone system. The recommendation system 146 may be configured to generate recommendations that may be based on the goo-location data monitored by the passive check-in system 144. An example system comprising a passive check-in system and a recommendation system is illustrated in FIG. 2.

Figure 2:
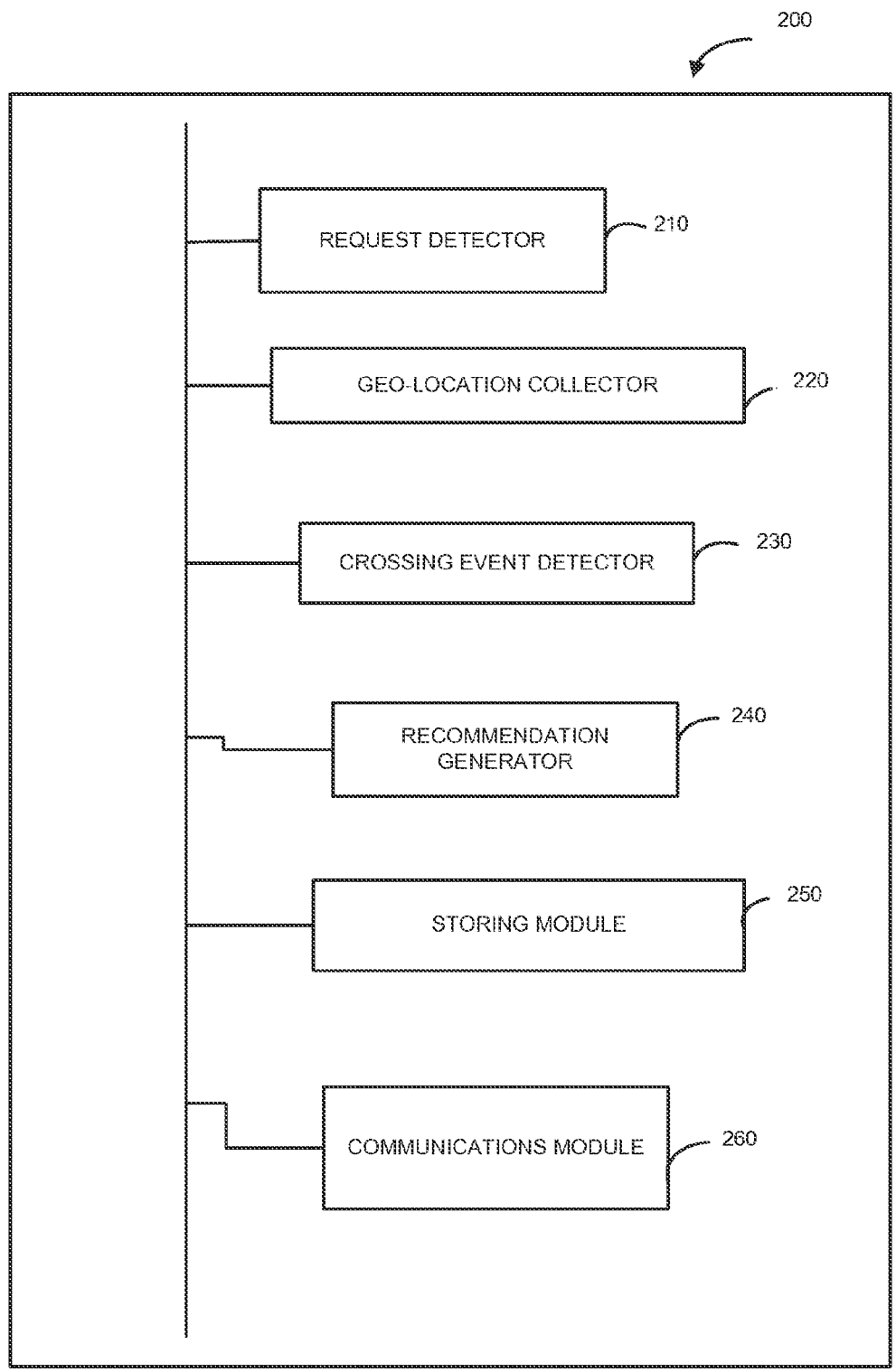
FIG. 2 is block diagram of a system to effectuate passive check-in with respect to a user's mobile device, in accordance with one example embodiment.

FIG. 2 is a block diagram of a system 200 to effectuate passive check-in with respect to a user's mobile device, in accordance with one example embodiment. As shown in FIG. 2, the system 200 includes a request detector 210, a geo-location collector 220, a crossing event detector 230, and a recommendation generator 240. The request detector 210 is configured to detect, at a server computer system, a request from a mobile device. The geo-location collector 220 is configured to collect current geo-location data for the mobile device from the request detected at the server computer system. As explained above, such a request may be initiated from a mobile device using a browser application or a mobile app. The request may be directed to the on-line trading platform 142 of FIG. 1, or to any other web-based platform configured to cooperate with the passive check-in system 144 of FIG. 1.

The crossing event detector 230 is configured to determine a crossing of a geo-fence event for the mobile device at the server computer system based on the current geo-location data and previous geo-location data for the mobile device. The crossing event detector 230 is also configured to access a database of geo-fence data to determine lack of a crossing of a geo-fence event tier the mobile device. The geo-location data, as well as one or more geo-fences, may be stored in the database 150 of FIG. 1. The recommendation generator 240 is configured to generate a recommendation for a user of the mobile device responsive to the crossing of a geo-fence event. The recommendation generator 240 may be included with the passive check-in system 144 of FIG. 1, with the on-line trading platform 142, or it may be part of a stand-alone recommendation system that cooperates with the passive check-in system 144.

Also shown in FIG. 2 are a storing module 250 and a communications module 260. The storing module 250 is configured to store the current geo-location data as previous geo-location data, as new location data is received from a mobile device. The communications module 260 is configured to provide the recommendation generated by the recommendation generator 240 from the server computer system to the mobile device. Example operations performed by the passive check-in system 144, which may be in cooperation with the on-line trading platform 142 and/or with the recommendation system 146 are described with refrence to FIG. 3.

Figure 3:
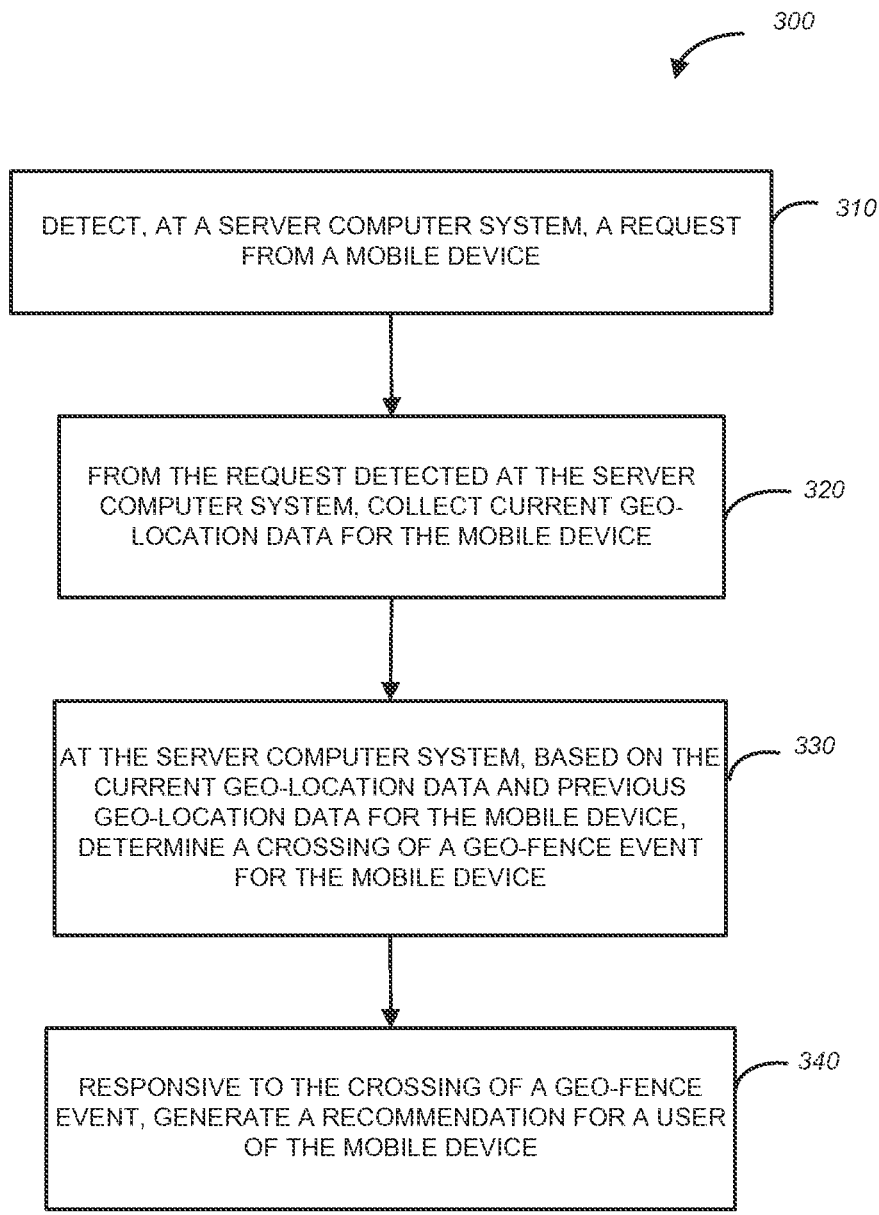
FIG. 3 is a flow chart of a method to effectuate passive check-in with respect to a user's mobile device, in accordance with an example embodiment.
Figure 4:
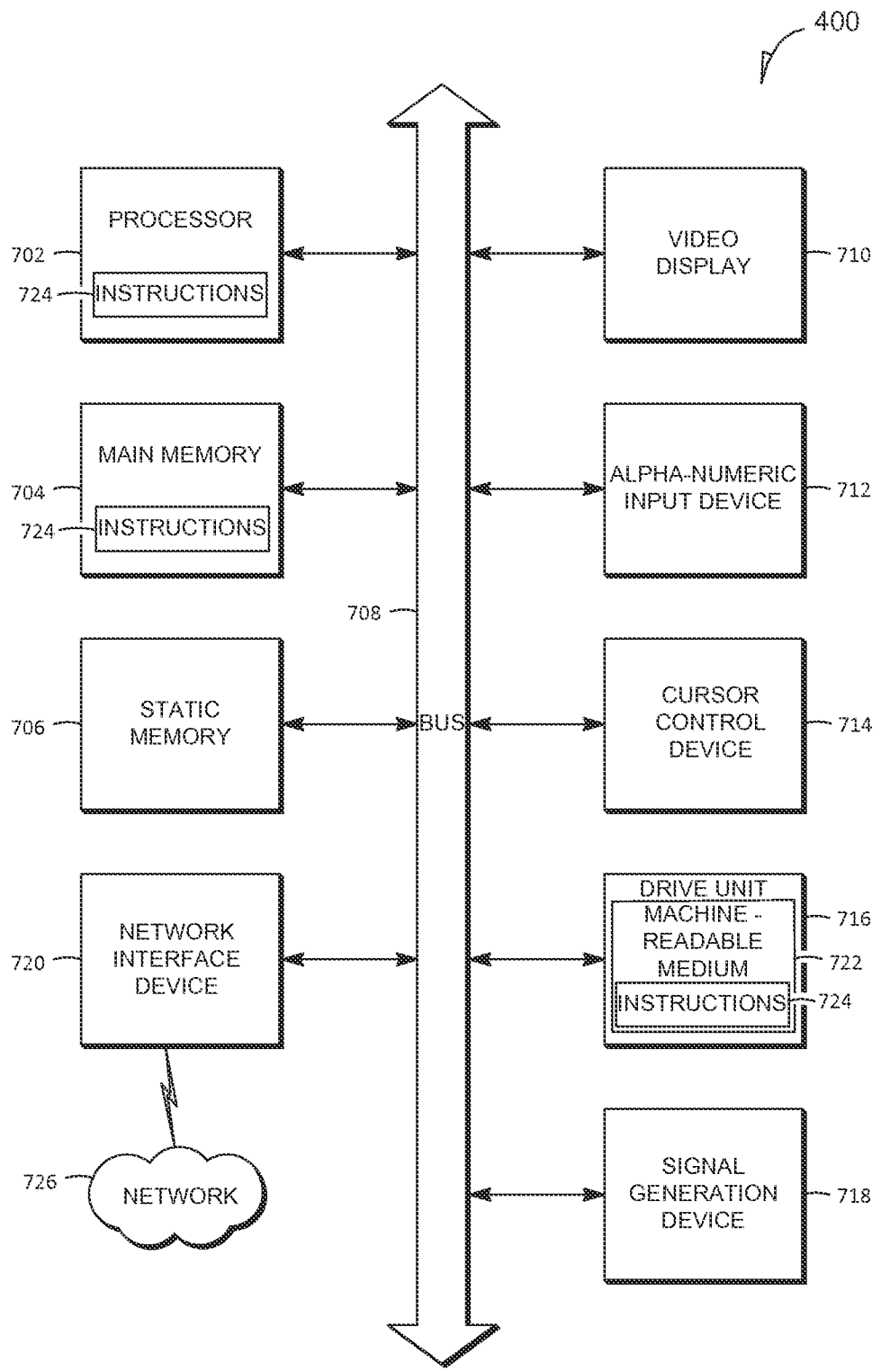
FIG. 4 is a diagrammatic representation of an example machine in the form of a computer system within which a set of instructions, for causing the machine to perform any one or more of the methodologies discussed herein, may be executed.

FIG. 3 is a flow chart of a method 300 to effectuate passive check-in with respect to a user's mobile device, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the request detector 210 detects a request from a mobile device. At operation 320, the geo-location collector 220 collects current geo-location data for the mobile device from the detected request. At operation 330, the crossing event detector 230 determines a crossing of a geo-fence event for the mobile device, based on the current geo-location data and previous geo-location data for the mobile device. The recommendation generator 240 generates a recommendation for a user of the mobile device responsive to the crossing of a geo-fence event, at operation 340.

Method and system to effectuate passive check-in with respect to a user's mobile device may be utilized beneficially in conjunction with on-line services, on-line marketplaces, social networks, and any user data collection services that track user behavior on-line and offline, On-line behavior of users may be tracked in various ways by recording the user's search history, browsing history, purchase history, and social networking history. On-line services may further track user offline behavior using, for example, GPS location services, purchase histories, and other information. In various embodiments, the user behavior is stored in a user profile. The user profile can include characteristics of the user (e.g., demographic data, hobbies, organizations that the user is a member of), past behavior of the user, on-going behavior of the user, and current behavior of the user. The user profile may include a list of "special locations" associated with the user, such as the user's home, the user's place of works, the user's place of worship, the user's gym, etc. These "special locations" may be determined based on the location stream monitored by a passive check-in system by tracking the periods of time during which the user is located within respective boundaries of those "special locations."

The special locations are unique to the user. If for example, a first user regularly shops at a store, the user profile indicates that the location is a store where the user likes to shop. If a second user works at the store (e.g., the location date monitored by a passive check-in system indicates that the user is present at the store for over twenty hours per week), the user profile of the second user may be updated to indicate that the store location is the second user's workplace.

Using the passive check-in data and the user's profile data, time-sensitive recommendations may be identified and presented to the user. Recommendations may be determined by a recommendation system provided with the passive check-in system or by a recommendation system provided with an associated web-based platform, such as, e.g., an on-line trading platform, a social networking system, etc.

For example, if it is 7 pm on a weeknight and the user's passive check-in data indicates that the user has been at work for 11 hours and has last visited the cafeteria 6 hours ago, a recommendation system will identify that the user may be hungry for dinner. The recommendation system, upon accessing the user's profile, identifies that the user enjoys Italian food. The system matches the user's location and preference to a record of an Italian restaurant nearby. The recommendation system, by reviewing the user behavioural data, may identify an on-line review written by the user 6 months ago giving the restaurant a bad rating. The recommendation system may then find another restaurant to recommend in the area (or along the user's normal route home from work) that the user has not yet visited, has reviewed franchise location positively, or has reviewed positively in the past.

In another example, a user may have several recent passive check-ins at toy stores in the user's neighbourhood. If the user's profile indicates that the user does not have any children, the recommendation system may identify an upcoming baby shower that the user has been invited to via a social network. The recommendation system may then filter recommendations to identify local toy stores that the user may not know about but are stores where his friends regularly shop. The recommendation system may also provide recommendations for on-line stores based on, for example, a registry identified in the shower invitation, a blog article recommending baby toys, or expedited shipping options available from on-line businesses (depending on the date of the shower).

In some instances, the recommendation system may determine that two users, who are "friends" in the context of a social network, are geographically near each other. The friends may be preparing to go to an event, for which they both have electronic tickets or one friend may have flown in from out of town for the weekend (which could be determined based on an on-line airline ticket purchase). The recommendation system may access both users' profiles to identify recommendations for them to do together. For example, if it is dinner time and they are in a downtown area and the time is fairly early for an event, the recommendation system will provide recommendations based on both users' profiles. For example, the profile of the first user may indicate that the first user has searched for Ethiopian restaurants in the past week and the profile of the second user may indicate that the second user is vegan. The system, using this data and the locations of the users and the event, may then identify a nearby Ethiopian restaurant that is open and is popular with on-line reviewers who are vegan.

FIG. 7 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (RDA), acellular telephone, a web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a drive unit 716, a signal generation device 718 (e.g., a speaker) and a network interface device 720.

The drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like. Furthermore, the tangible machine-readable medium is non-transitory in that it does not embody a propagating signal. However, labeling the tangible machine-readable medium as "non-transitory" should not be construed to mean that the medium is incapable of movement the medium should be considered as being transportable from one physical location to another. Additionally, since the machine-readable medium is tangible, the medium may be considered to be a machine-readable device.

The embodiments described herein may be implemented in an operating environment comprising software installed on a computer, in hardware, or in a combination of software and hardware. Such embodiments of the inventive subject matter may be related to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations, it will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules in embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may he performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to effectuate passive check-in with respect to a user's mobile device has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   detecting, at a server computer system, a request from a mobile device;
   from the request detected at the server computer system, collecting current geo-location data for the mobile device, using at least one processor;
   at the server computer system, comparing the current geo-location data to a previously stored geo-location data for the mobile device;
   based on a result of the comparing, determining a crossing of a geo-fence event for the mobile device, the determining of the crossing of a geo-fence event for the mobile device comprising accessing a database of geo-fence data; and
   responsive to the crossing of a geo-fence event, generating a recommendation for a user of the mobile device.

2. The method of claim 1, comprising storing the current geo-location data as previous geo-location data.

3. The method of claim 1, comprising providing the recommendation from the server computer system to the mobile device.

4. The method of claim 1, wherein the request originated from a mobile application executing on the mobile device.

5. The method of claim 1, wherein the request originated from a browser application executing on the mobile device.

6. The method of claim 1, wherein the request is directed to an on-line trading platform, the on-line trading platform provided on the server computer system.

7. The method of claim 1, comprising storing one or more geo-fences for use with the current geo-location data to detect a geo-fence event for the mobile device.

8. The method of claim 1, comprising:
    detecting, at the server computer system, a further request from the mobile device;
    from the request detected at the server computer system, collecting current geo-location data for the mobile device;
    at the server computer system, based on the current geo-location data and the previous geo-location data for the mobile device, determining lack of a crossing of a geo-fence event for the mobile device; and
    storing the current geo-location data as previous geo-location data.

9. The method of claim 1 comprising analyzing stored previous geo-location data for the mobile device to determine a special location associated with the mobile device, the stored previous geo-location data comprising a plurality of geo-location data values, the special location associated with an activity of a user of the mobile device.

10. A computer-implemented system comprising:
    at least one processor coupled to a memory;
    a request detector to detect, at a server computer system, using the at least one processor, a request from a mobile device;
    a geo-location collector to collect, using the at least one processor, current geo-location data for the mobile device from the request detected at the server computer system;
    a crossing event detector to:
        compare the current geo-location data to a previously stored geo-location data for the mobile device and,
        based on a result of the comparison, determine, using the at least one processor, a crossing of a geo-fence event for the mobile device, the determining of the crossing of a geo-fence event for the mobile device comprising accessing a database of geo-fence data; and
    a recommendation generator to generate, using the at least one processor, a recommendation for a user of the mobile device responsive to the crossing of a geo-fence event.

11. The system of claim 10, comprising a storing module to store, using the at least one processor, the current geo-location data as previous geo-location data.

12. The system of claim 10, comprising a communications module to provide the recommendation from the server computer system to the mobile device, using the at least one processor.

13. The system of claim 10, wherein the request originated from a mobile application executing on the mobile device.

14. The system of claim 10, wherein the request originated from a browser application executing on the mobile device.

15. The system of claim 10, wherein the request is directed to an on-line trading platform, the on-line trading platform provided on the server computer system.

16. The system of claim 11, wherein the storing module is to store one or more geo-fences for use with the current geo-location data to detect a geo-fence event for the mobile device.

17. The system of claim 10, wherein:
    the request detector is to detect, at the server computer system, a further request from the mobile device;
    the geo-location collector is to collect current geo-location data for the mobile device from the request detected at the server computer system; and
    the crossing event detector is to determine lack of a crossing of a geo-fence event for the mobile device at the server computer system, based on the current geo-location data and the previous geo-location data for the mobile device.

18. A machine-readable non-transitory storage medium having instruction data to cause a machine to perform operations comprising:
    detecting, at a server computer system, a request from a mobile device;
    collecting current geo-location data for the mobile device from the request detected at the server computer system;
    at the server computer system, comparing the current geo-location data to a previously stored geo-location data for the mobile device;
    based on a result of the comparing, determining a crossing of a geo-fence event for the mobile device, the determining of the crossing of a geo-fence event for the mobile device comprising accessing a database of geo-fence data; and
    generating a recommendation for a user of the mobile device responsive to the crossing of a geo-fence event.

* * * * *